United States Patent [19]

Kusmenskji et al.

[11] Patent Number: 4,553,618
[45] Date of Patent: Nov. 19, 1985

[54] WEIGHING CELL

[75] Inventors: Karl-Heinz Kusmenskji; Harald Beck, both of Pohlheim, Fed. Rep. of Germany

[73] Assignee: Mettler-Waagen GmbH, Giessen, Fed. Rep. of Germany

[21] Appl. No.: 522,435

[22] Filed: Aug. 11, 1983

[30] Foreign Application Priority Data

Aug. 20, 1982 [DE] Fed. Rep. of Germany ....... 3230998

[51] Int. Cl.⁴ .......................... G01G 23/10; G01G 7/00
[52] U.S. Cl. ..................................... 177/185; 177/212
[58] Field of Search ...................... 177/185, 200, 212

[56] References Cited

U.S. PATENT DOCUMENTS

| | | | |
|---|---|---|---|
| 2,767,974 | 10/1956 | Ballard et al. | 177/200 X |
| 3,556,237 | 1/1971 | Ailison | 177/200 |
| 3,670,833 | 6/1972 | Tomohiko et al. | 177/185 X |
| 4,212,361 | 7/1980 | Stocker | 177/200 |
| 4,236,590 | 12/1980 | Knothe et al. | 177/200 |
| 4,396,080 | 8/1983 | Dee | 177/185 |
| 4,460,054 | 7/1984 | Inkmann et al. | 177/185 X |

*Primary Examiner*—George H. Miller, Jr.
*Attorney, Agent, or Firm*—Flynn, Thiel, Boutell & Tanis

[57] ABSTRACT

A weighing cell, in which the weight forces of the load are compensated by deformation or electromechanical forces, includes a load carrier which receives the load, a mechanical-electrical load-measuring cell, and an acceleration meter which experiences the same vertical accelerations as the weighing cell. The load cell and the acceleration meter are connected electrically with one another such that the measuring signal which is adulterated by the acceleration action is corrected correspondingly. The load cell has an output signal (A+a) comprising a weighing signal (A) superposed by a spurious signal (a) due to such acceleration. A subtractor receives the output signal (A+a). The output signal of the acceleration meter is balanced to a value (a'). In one embodiment, a multiplier receives the balanced signal (a') and from the subtractor receives a weighing signal (A) from which said spurious signal (a) has been cleaned, the multiplier producing a signal corresponding to the spurious signal (a) and feeding it to the subtractor. In another embodiment, the additive weight-force component is balanced in the signal (a') and the signal (a') is fed to the subtractor. The output of the acceleration meter is also balanced to form a second signal (a″) in which the multiplicative weight-force component is compensated. This second signal (a″) is fed to a second subtractor, to which a reference voltage also is fed. An analogue-digital converter receives the outputs of both subtractors for producing the cleaned output signal (A).

6 Claims, 3 Drawing Figures

WEIGHING CELL

FIELD OF THE INVENTION

The invention relates to a weighing cell, in which the weight forces of the load are opposed by deformation or electromechanical forces, comprising a mechanical-electrical transducer, comprising a load carrier, which receives the load, a load-measuring cell and an acceleration meter, which experiences the same vertical accelerations as the weighing cell, whereby the load cell and the acceleration meter are connected electrically with one another such that the measuring signal which is made erroneous by the acceleration action is accordingly corrected.

BACKGROUND OF THE INVENTION

Weighing cells of the abovementioned type have the disadvantageous characteristic that they produce measured-value error due to vibration of their place of installation. The cause for this are the forces, which due to the mass acceleration act on the mechanical elements of the scales and on the mass to be weighed. Weighing cells of the type in question here, namely those which operate practically without displacement, are substantially more exposed to such interferences than displacement (odometrical) systems, as for example spring scales.

The abovedescribed weighing cells also must operate satisfactorily at places at which they are exposed to strong vibrations. If one wanted to eliminate the effect of vibrations only by accordingly structuring the scale, namely by dynamically balancing all lever elements of load introduction and measuring transformation, by referring their centers of gravity to one axis or by bringing same to congruency, this would mean a very considerable amount of expense, which in addition would not result in a 100% success. The other possibility consists in eliminating the interferences in the measuring signal by using suitable filter circuits. The utilization of such filters, however, has the disadvantage of undesirably long measuring times.

Weighing cells of the type in question here are also utilized in packaging machines and automatic control carriers. This means that the measuring times must be very short. These times are supposed to be less than 0.1 s. A weighing cell with electromagnetic force compensation, which operates practically without displacement and in which all effective elements, including the weighing dish and the measuring device, have mass, represents an almost ideal acceleration receiver for vertical, translatory vibrations. This is particularly true for low interfering frequencies. On the other hand, especially low interfering frequencies, when electronic filters are connected at the output end, require a long centering (balancing) time for the measuring operation.

An electrical weighing device for moving loads is known from German Patent No. 17 74 137, in which a load-measuring cell has an acceleration meter associated with it such that it experiences the same vertical accelerations. Load cell and acceleration meter are disposed in the same electrical circuit and are connected together such that the error (spurious) factor caused by the acceleration is supposed to be eliminated. Such a scale is supposed to be used on ships, in order to be able to weigh the catch even while in sloping positions due to high sea motion. The particularity of this solution consists in the acceleration meter changing the voltage which is delivered to the load cell, whereby the acceleration meter is supposed to be connected in series with the output circuit of the load cell. In the exemplary embodiment, the hanging scale is designed according to the wire strain gauge principle, namely same forms a quasi-force meter, while the acceleration meter is conceived as a potentiometric displacement pickup. It is here tried to compensate the output signal of a scale, which shows an acceleration meter for vibrations, with the output signal of an odometer. This functions satisfactorily only at a very special frequency. Moreover, the acceleration compensation acts only for a particular load drop.

The basic purpose of the invention is to construct a weighing cell of the abovementioned type such that on the one hand even at low interfering frequencies a satisfactory measuring result is obtained within the shortest time and that on the other hand the compensation is maintained automatically for the entire measuring range of the weighing cell.

This is attained according to a first solution of the purpose by the weighing signal produced by the load cell, and which signal is superposed by the spurious (error) signal, being fed to a subtractor, by the signal produced by the acceleration meter being balanced to a value and being fed to a multiplier, by the cleaned signal which comes from the subtractor being fed to the multiplier, and by the signal which is obtained from the multiplier being fed to the subtractor.

A second solution of the purpose of the invention is characterized by the weighing signal superposed by the spurious signal being fed to a subtractor, to which subtractor is also fed the signal from the acceleration meter after the latter signal is amplified and balanced such that the additive weight-force component is balanced, by a second signal which is produced by the acceleration meter and is balanced such that the multiplicative weight-force component is compensated and thereafter is fed to a second subtractor, by a reference voltage also being fed to the second subtractor, and by the outputs of both subtractors being fed to an analogue-digital converter which delivers the cleaned output signal.

The spurious (error) signal (a), which starts out from the load cell, and which signal is superposed by the weighing signal (A), is caused on the one hand by a constant mass portion of the weighing cell, namely by the levers, the weighing dish, etc. and on the other hand has a part which depends on the load. The signal (a) which is delivered for the compensating of the acceleration meter must also necessarily consist of an additive and a multiplicative component. The adjustment of the compensation signal (a) which is delivered by the acceleration meter must thus also be adjusted to the respective mass which is placed onto the weighing cell. This can be achieved according to the invention by both the signal produced by the subtractor and also the signal produced by the acceleration meter and which is if desired amplified being fed to a multiplier, whereby the product of these two signals must equal the spurious signal (a). Said signal (a) is then in turn fed to the subtractor. This circuit of subtractor and multiplier acts in the form of a dividing building block. This solution has proven to be especially advantageous, since on the one hand a balancing for any desired load exists and on the other hand the cleaned signal (A) is used as a multiplier factor.

It is possible to achieve with the inventively constructed measuring cell an important improvement in the interference behaviour by a factor of 20 or more.

Further advantageous developments of the invention can be taken from the subclaims in connection with the description and drawings.

BRIEF DESCRIPTION OF THE DRAWINGS

One exemplary embodiment of the invention is described in greater detail hereinafter in connection with the drawings, in which.

DETAILED DESCRIPTION

Figure 1:
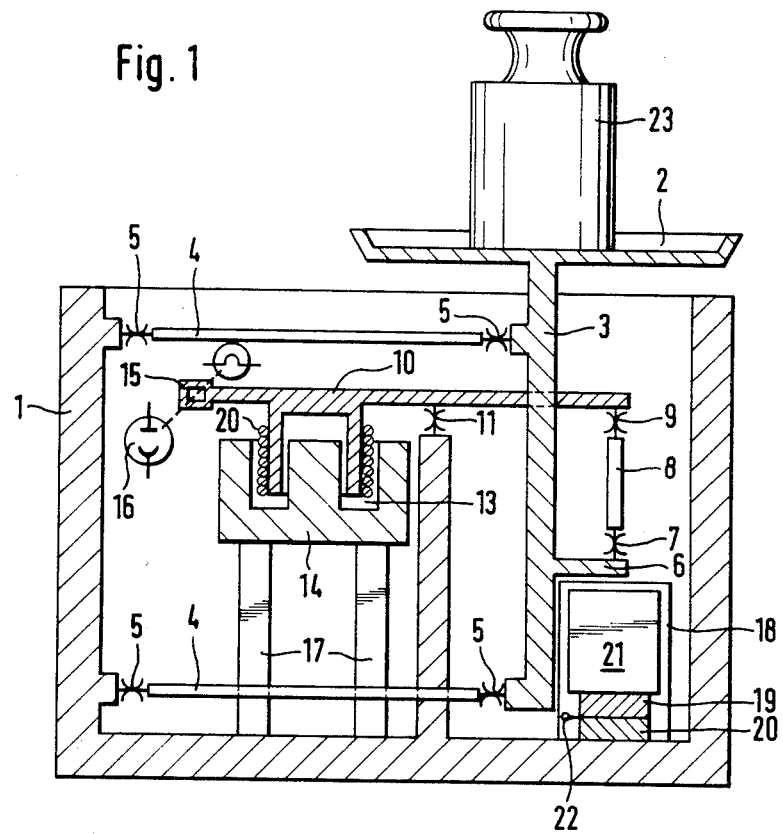
FIG. 1 is a cross-sectional view of an inventively constructed weighing cell.

FIG. 1 is a cross-sectional viewe of a weighing cell, which has a strong housing 1, which can be closed off with a lid (not illustrated). A weighing dish 2 is connected to an attachment 3, which is guided through two guide rods 4. The two guide rods 4 are connected both to the attachment 3 and also to the housing 1 through flexible bearings 5. Through this it is achieved that only vertical movements of the weighing cup are possible.

A coupling 8 is connected to a plate 6 of the attachment through a further flexible bearing 7, the other end of which coupling is connected to a lever 10 through a flexible bearing 9. The pivot point of the lever 10 is formed by a pillow-block bearing 11.

An electrical coil 12 is connected to the lever 10, which coil dips into the air space 13 of a magnet 14. The position of the free end 15 of the lever 10 is scanned by a zero position scanner 16, which in the exemplary embodiment consists of a photodiode and a light source. The permanent magnet 15 is connected fixedly to the housing 1 through a column 17.

An acceleration meter 18 is furthermore arranged in the housing 1 of the weighing cell, which meter 18 lies in the direct vicinity of the attachment 3 and is installed in the housing such that same is exposed to the same impacts as the attachment 3. If there is sufficient space, it would be advantageous to arrange the acceleration meter 18 in the extension of the attachment 3 which receives the load. The acceleration meter 18 consists of two piezoelectrical plates 19 and 20, which are clamped between a seismic mass 21 and the bottom of the housing 1. If the weighing cell is accelerated, then the seismic mass 21 applies a proportional force onto the piezoelectrical plates 19 and 20. These emit an event-analogue alternative-current voltage through the connection 22. We are dealing here with an oscillatory system with a degree of freedom in the direction of load introduction.

If an electrical current flows through the coil 12, a force is created, which is opposite to the weight load. With the photoelectrical zero-position scanner it is possible to recognize a defined centering position of the load carrier. During a change of the load, for example if a weight 23 is placed on the weighing dish, a regulator with amplifier changes the current which flows through the coil until the centering position, namely the zero position, is again reached.

To compensate the weight force a current is guided through the coil in the described weighing cell.

A signal voltage is tapped off from the current circuit through a measuring rheostat, which signal voltage is directly proportional to the load.

Figure 2:
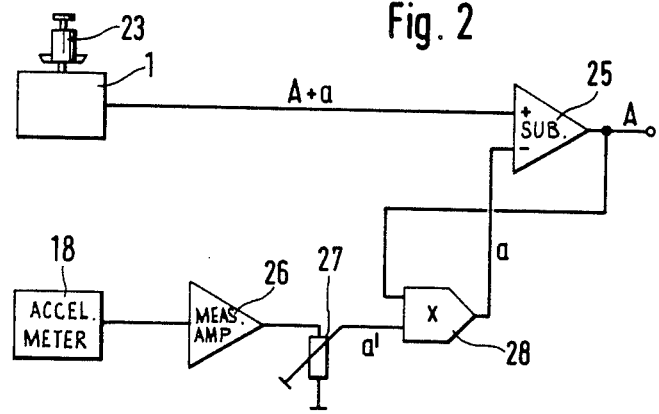
FIG. 2 illustrates an electrical circuit for the compensation of the spurious signal according to the first solution of the purpose of the invention.

This signal, which starts out from the weighing cell and is caused by the load and which is composed of the weighing signal (A) and spurious signal (a), is fed to a subtractor 25 (FIG. 2). The signal which comes from the connection 22 of the acceleration meter 18 is fed to a measuring amplifier 26 and is amplified accordingly and is balanced on an adjuster 27. This balancing is carried out in connection with the exemplary embodiment in such a manner that a signal (a) is obtained. That signal is fed to the subtractor. In carrying out the balancing, the variable load (A) must be considered. A signal a' is used for the balancing, which signal occurs at the output of the adjuster 27. Said signal a' is in the FIG. 2 embodiment fed to a multiplier 28, to which also is fed the cleaned signal A, which is taken from the output of the subtractor 25. For the balancing of the system, a' must be adjusted such that the condition $a = a' \times A$ is met. The output signal a of the multiplier 28 is then fed to the subtractor 25, so that the cleaned weighing signal A is obtained at the output of the subtractor.

The weighing cell thus delivers as output signal the weighing signal A, on which is superposed a spurious signal a. Since the scale has a constant mass portion, consisting of lever, weighing dish, etc. and the mass 23 which is to be weighed and which is changeable, the compensation signal a must also consist of an additive and a multiplicative component in order to obtain an optimum compensation. This is achieved by the signal A, from which has been cleaned the spurious signal, being utilized for detecting the changeable mass for adjusting the signal which is delivered by the acceleration meter.

Figure 3:
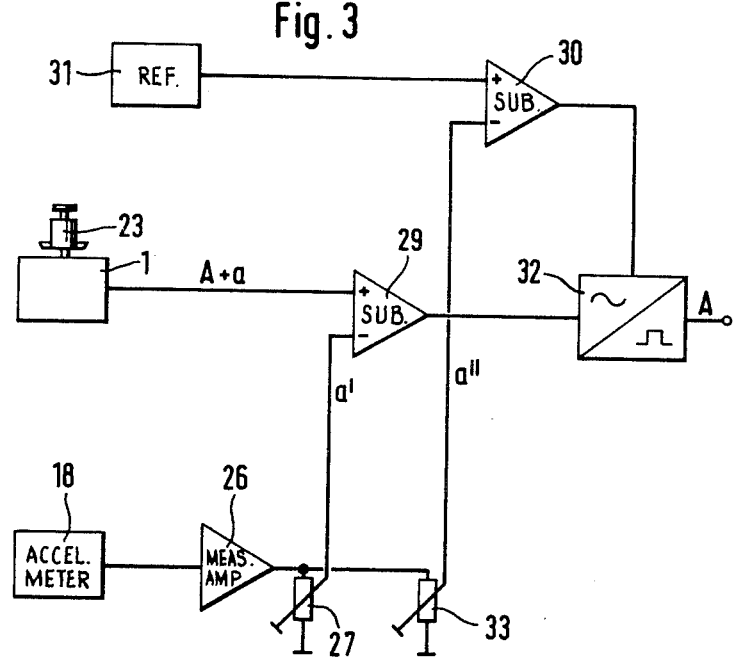
FIG. 3 illustrates an electrical circuit for the compensation of the spurious signal according to the second solution of the purpose of the invention.

In the circuit according to FIG. 3, the weighing signal $A + a$, including the superposed spurious signal a, is also fed to a subtractor which is here identified by reference numeral 29, which subtractor, further like the circuit of FIG. 2, receives also a signal a' produced by also amplifying in amplifier 26 and balancing at adjuster 27 of the output from the acceleration meter 18. Different from the circuit of FIG. 2 is that a second signal a" is produced by adjusting at an adjuster 33 the output from the acceleration meter 18, which second signal a" is fed to a second subtractor 30. The adjusting is such that the multiplicative weight force component is compensated. A reference voltage from a reference voltage source 31 is also fed to the second subtractor. The outputs of both subtractors 29 and 30 are fed to an analogue-digital-converter 32, which delivers the cleaned output signal A.

Tests have shown, that with the inventive device and compensation an improvement in the spurious behavior of more than a factor of 20 is obtained, and this at constant short centering (balancing) times. This advantage exists in particular for low frequencies. At higher frequencies a certain decrease of spurious signal immunity is seen; however, this is of a subordinate importance because it is easily possible at such higher frequencies to connect filters at the output side without having the measuring time be significantly extended.

We claim:

1. A weighing cell, in which the weight forces of the load are compensated by deformation or electromechanical forces, including a load carrier which receives the load, a mechanical-electrical load-measuring cell, an acceleration meter which experiences the same vertical accelerations as the weighing cell, wherein the load cell and the acceleration meter are connected electrically with one another such that the measuring signal which is adulterated by the acceleration action is corrected correspondingly, including the improvement comprised in that the load cell has an output signal (A+a) comprising a weighing signal (A) superposed by a spurious signal (a) due to said acceleration, a subtractor receiving said output signal (A+a), means for balancing the output signal of the acceleration meter to a value (a'), a multiplier receiving said balanced signal (a'), the multiplier also receiving from the subtractor a weighing signal (A) from which said spurious signal (a) has been cleaned, said multiplier producing a signal corresponding to said spurious signal (a) and feeding it to the subtractor.

2. A weighing cell according to claim 1 in which the acceleration meter is a piezoelectric transducer.

3. A weighing cell according to claim 1 in which the acceleration meter is built into the weighing cell and the acceleration meter is arranged in one of an extension of the force introducing member of the weight to be determined and in the direct vicinity of the latter.

4. A weighing cell, in which the weight forces of the load are compensated by deformation or electro-mechanical forces, including a load carrier which receives the load, a load measuring cell, an acceleration meter which experiences the same vertical acceleration as the weighing cell, the load cell and acceleration meter being connected electrically with one another such that the measuring signal which has been adulterated by the acceleration action is corrected correspondingly, wherein the improvement is comprised in that the load cell has an output signal (A+a) comprising a weighing signal (A) superposed by a spurious signal (a) due to said acceleration, a subtractor receiving said output signal (A+a), means for amplifying and balancing the output signal of the acceleration meter to form a signal (a') in which the additive weight-force component is balanced and feeding said signal (a') also to said subtractor, means also fed the output of the acceleration meter and balancing same to form a second signal (a'') in which the multiplicative weight-force component is compensated and feeding said second signal (a'') to a second subtractor, a reference voltage also fed to said second subtractor, an analogue-digital converter to which the outputs of both subtractors are fed for producing the cleaned output signal (a).

5. A weighing cell according to claim 4 in which the acceleration meter is a piezoelectric transducer.

6. A weighing cell according to claim 4 in which the acceleration meter is built into the weighing cell and the acceleration meter is arranged in one of an extension of the force introducing member of the weight to be determined and in the direct vicinity of the latter.

* * * * *